United States Patent [19]
Laurer et al.

[11] 3,850,794
[45] Nov. 26, 1974

[54] GAS-COOLED NUCLEAR REACTOR

[75] Inventors: Erwin Laurer; Hans-Peter Schabert, both of Erlangen, Germany

[73] Assignee: Siemens Aktiengesellschaft, Berlin and Munich, Germany

[22] Filed: Mar. 8, 1972

[21] Appl. No.: 232,915

Related U.S. Application Data
[63] Continuation of Ser. No. 821,030, May 1, 1969, abandoned.

[52] U.S. Cl. ............. 176/30, 176/87, 214/18 N
[51] Int. Cl. ............................... G21c 19/20
[58] Field of Search ......... 176/30, 31, 32, 58, 59, 176/76, 78, 81, 19, 40, 87; 214/18 N

[56] References Cited
UNITED STATES PATENTS

| | | | |
|---|---|---|---|
| 3,201,320 | 8/1965 | Fortescue et al. | 176/78 |
| 3,205,144 | 9/1965 | Jabsen | 176/50 |
| 3,432,388 | 3/1969 | Fortescue | 176/87 X |
| 3,475,272 | 10/1969 | Fortescue et al. | 176/40 |
| 3,481,832 | 12/1969 | Rickert | 176/50 |
| 3,600,277 | 8/1971 | Germer | 176/30 |

FOREIGN PATENTS OR APPLICATIONS

| | | | |
|---|---|---|---|
| 968,091 | 8/1964 | Great Britain | 214/18 N |

Primary Examiner—Carl D. Quarforth
Assistant Examiner—P. K. Pavey
Attorney, Agent, or Firm—Herbert L. Lerner

[57] ABSTRACT

Gas-cooled nuclear reactor includes a grid-like core support plate having a plurality of cells formed therein, and a group of at least nine fuel elements of elongated prismatic shape combined together and suspended substantially vertically at the upper end thereof and extending through each of the cells, the fuel elements being exchangeable from above the support plate.

9 Claims, 7 Drawing Figures

GAS-COOLED NUCLEAR REACTOR

This is a continuation of application Ser. No. 821,030, filed May 1, 1969, now abandoned.

Our invention relates to gas-cooled nuclear reactors.

Gas-cooled nuclear reactors and especially fast breeder reactors, that are generally cooled with $CO_2$ or helium, are coordinated as a rule with a relatively larger heat exchanger in a concrete pressure vessel. What is sought after is to achieve the most direct and reliable means for exchanging fuel elements of the reactor core from above. Furthermore, the fuel elements should be suspended on the cold side of the reactor so that, in case of overheating, they can fall freely toward the hot side onto the distributor cone so that the so-called second excursion does not occur. The coolant flow in the reactor is directed downwardly from above.

It is an object of our invention to provide gas-cooled nuclear reactor with a core structure wherein the active lengths of the fuel elements are packed flush together over the entire cross section of the core. It is a further object of our invention to provide such a gas-cooled nuclear reactor with the most expedient system for removing and replacing the fuel elements.

With the foregoing and other objects in view, we provide in gas-cooled nuclear reactor, a grid-like core support plate having a plurality of cells formed therein, and a group of at least nine fuel elements of elongated prismatic shape combined together and suspended substantially vertically at the upper end thereof and extending through each of the cells, the fuel elements being exchangeable from above the support plate.

In accordance with other features of our invention, the core support plate and the fuel elements are located directly beneath an upper cover plate, having a planar upper and lower surface, of a cylindrical pressure vessel formed of concrete, and especially of segment-shaped, prefabricated, prestressed concrete parts and a conical closure member closing the lower opening of the pressure vessel. The core support plate proper is fastened with tie rods to the cover plate. All of the components installed in the pressure vessel are removable downwardly in succession through the lower opening of the pressure vessel after removal of the lower conical closure member therefrom.

In accordance with another feature of our invention, in each of the groups of combined fuel elements, eight of the fuel elements are disposed about the ninth fuel element and are indented on two adjoining sides in the upper portion thereof located at the level of the core support plate, and are provided at the upper end of the two adjoining sides with collar-like suspension hooks. The indentation or reduction in cross section of the fuel elements at the respective upper portions thereof is equal to substantially half the thickness of the cross-pieces of the core support plate defining the cells thereof. Accordingly, all of the fuel elements, whether ordinary fuel elements or breeder fuel elements, engage one another over the entire cross section of the nuclear core below the support plate.

In accordance with a further feature of our invention, the ninth and middle fuel element, in contrast to the eight fuel elements surrounding the same, has a uniform square cross section over the entire length thereof and is provided at the upper end thereof with laterally projecting mounting strips for supporting the same on the adjacent fuel elements. One of the fuel elements, especially the middle or ninth fuel element, may be provided with a control rod in accordance with the required core structure.

To reduce undue stressing of the fuel rod jacket or encapsulating tube, pressure equalization with respect to the surrounding coolant i.e., fuel venting, can be effected in the fuel rods. It is accordingly necessary to connect the individual fuel rods to a further pressure gas system wherein an underpressure lower than of the external main coolant is maintained. For this purpose, in accordance with an added feature of our invention, we provide the tops of the fuel elements with connecting lines for effecting the pressure equalization in the fuel rods. When employing $CO_2$ as main coolant, it is advantageous to thus effect the pressure equalization with helium.

In accordance with an additional feature of the invention, the fuel elements are provided at the upper portion thereof with means for throttling the main coolant flow and with connections for throttle adjustment in the tops or heads of the fuel elements.

We also provide, as another feature of the invention, a thermocouple element installed at the lower end of each fuel element for determining the gas outlet temperature, the tops or heads of the fuel elements being therefore provided with connections for the respective thermocouple elements.

For the purpose of effecting the exchange of fuel elements, we further provide in accordance with our invention, a cover plate for the pressure vessel and a thermal shield both formed with a bore located above the middle or ninth fuel element. The bore is closed with a stopper, and the middle or ninth fuel element and thereby also the eight elements surrounding the same are held down by the stopper through the intermediary of a hollow cylindrical extension provided with lateral holes. The extension of the stopper is provided on the lower end thereof with couplable connections for the pressure equalizing lines and the thermocouple elements in the heads or tops of the fuel elements. When control rods are provided in the middle or ninth fuel elements, the control rod drive mechanisms may be located in these stoppers, respectively, so that the loading device for the fuel elements can travel directly above the cover plate.

The exchange of the fuel elements is carried out when the reactor is shut down. After the stopper has been withdrawn by a loading machine with a fuel element drum magazine (for example for nine fuel elements and two stoppers) which is capable of travelling on the upper side of the cover plate, a winch and manipulator or clamping linkage, a tubular hold-down member for the outer fuel elements is driven in through the bore of the cover plate.

After the hold-down tube has been driven into the pressure vessel, the middle or ninth fuel element is then withdrawn by means of a manipulator of claw travelling within the hold-down tube. The hold-down tube has the function, in accordance with our invention, of preventing release or disengagement of the outer eight fuel elements when the middle or ninth fuel element is withdrawn from the core support plate.

In accordance with other features of the invention, the hold-down tube is provided at the lower end portion thereof with a lateral opening extending over an angle of substantially 90° of the cross section of the tube, so that the manipulator head of the manipulator device can travel therethrough laterally out of the hold-down tube. The hold-down tube and the manipulator device are coaxially rotatable in steps of 45° each.

After the middle or ninth fuel element has been withdrawn from the core, the outer eight fuel elements are seized by the manipulator head of the fuel element manipulator device, which is capable of travelling through the lateral opening formed in the hold-down tube, and are also withdrawn from the core.

When inserting the replacement fuel elements into the core, the reverse sequence is adhered to, namely first the corner fuel elements of the surrounding eight fuel elements and then the fuel elements between the corner elements are suspended so that they extend through the cell of the core support plate. To straighten-out these outer eight fuel elements, a spreading tool is inserted which places these fuel elements in an accurate vertical position. Thereafter, the middle or ninth fuel element is finally inserted in the nuclear core and, after introducing the stopper and the extension thereof, the middle fuel element and the outer eight fuel elements, accordingly, are held down thereby.

Other features which are considered as characteristic for the invention are set forth in the appended claims.

Although the invention is illustrated and described herein as embodied in gas-cooled nuclear reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
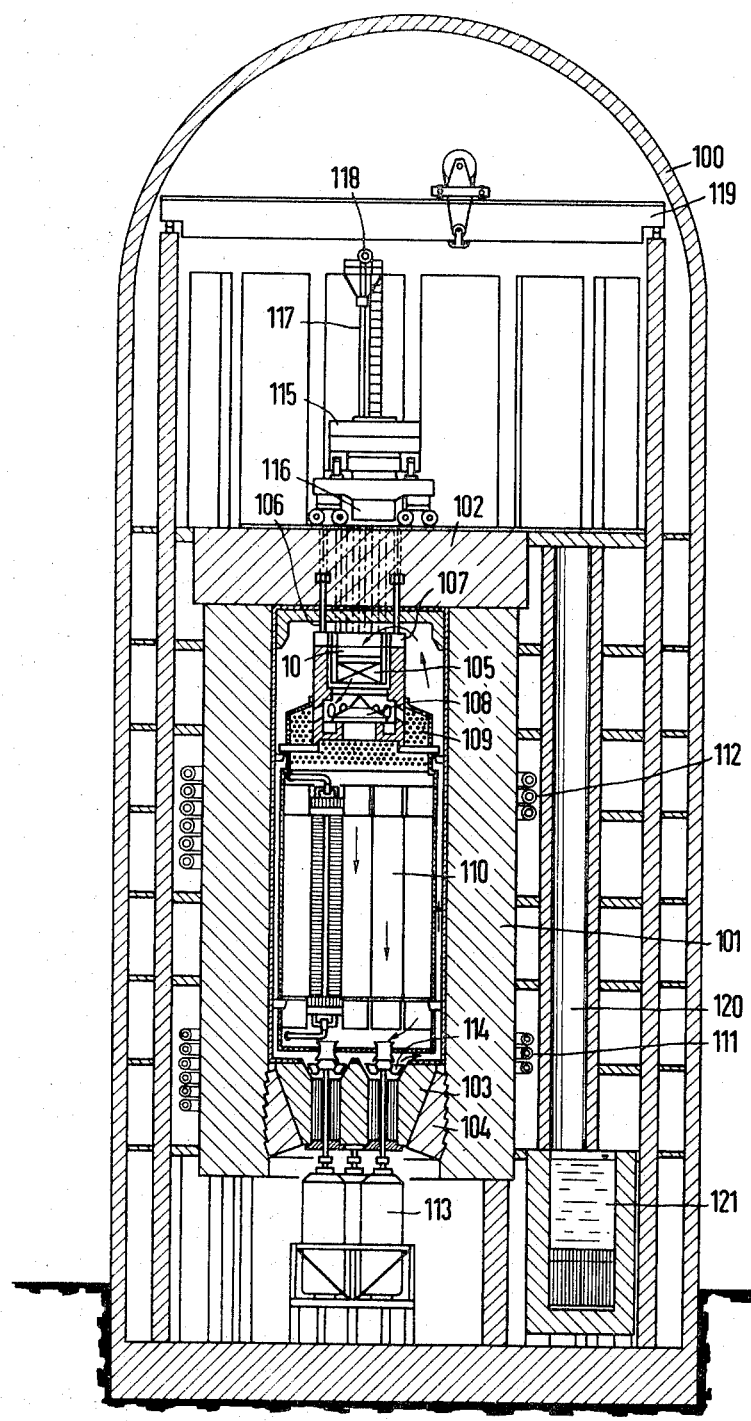
FIG. 1 is a partly diagrammatic vertical section through a gas-cooled fast breeder reactor constructed in accordance with our invention.

Referring now to the drawings, and first particularly to FIG. 1 thereof, there is shown a fast breeder nuclear reactor installation having a reactor core 105 located in the upper part of a cylindrical, tubular prestressed concrete pressure vessel 101. The pressure vessel 101 is formed of prestressed segment-shaped prefabricated components and is closed at the upper end thereof by a flat cover plate 102 and at the lower end thereof by a conical insert member 103. The regular fuel elements and the breeder fuel elements in the reactor core 105 are suspended in a core support plate 10 which is in turn fastened by tie rods 106 to the cover plate 102 located therabove. Directly below the fuel elements of the core 105, there is located a distributor or separator cone 108 and a graphite shielding 109 which is formed of steel tubes filled with graphite and serves as a neutron shield. A steam generator 110 is located in the lower part of the pressure vessel 101. Feed water is supplied through the collecting lines of manifolds 111 to this steam generator 110 while the live steam is discharged through the tubes 112. Passages are provided in the lower conical closure member 103 through which the drive shafts for coolant blowers 114 extend, the drive shafts being driven by blower motors 113 located therebeneath. The coolant accordingly flows through the reactor core 105 and the heat exchanger in a downward direction from above. The steam generator 110 and the reactor core 105 can be disassembled and removed out of the pressure vessel 101 from below. Thus, the conical closure member 103 is initially raised and the wedges 104 between the closure member 103 and the wall 101 of the pressure vessel are removed from below. Thereafter, the closure member 103 can also be lowered, so that the steam generator 110 is accessible from below. A loading machine 115 travels on the surface of the cover plate 102. The loading machine 115 is provided with a fuel element drum 116, a manipulator or clamp guiding tube 117 and a winch 118 for raising and lowering the manipulator or clamp linkage. A concentric running crane 119 is located above the loading machine 115. The entire fast breeder reactor is enclosed by a reactor housing or containment structure 100.

Figure 2A:
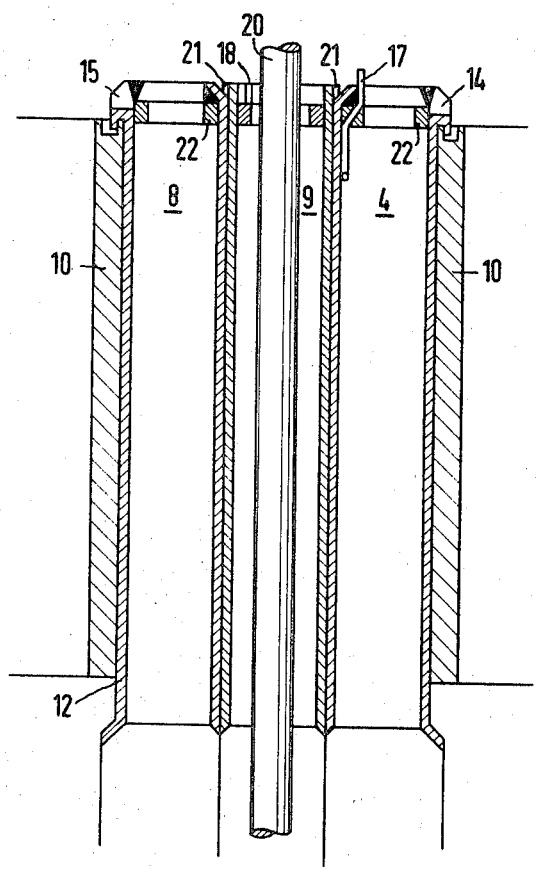
FIG. 2a is a longitudinal sectional view of FIG. 2b taken along the line IIA—IIA in the direction of the arrows.
Figure 2B:
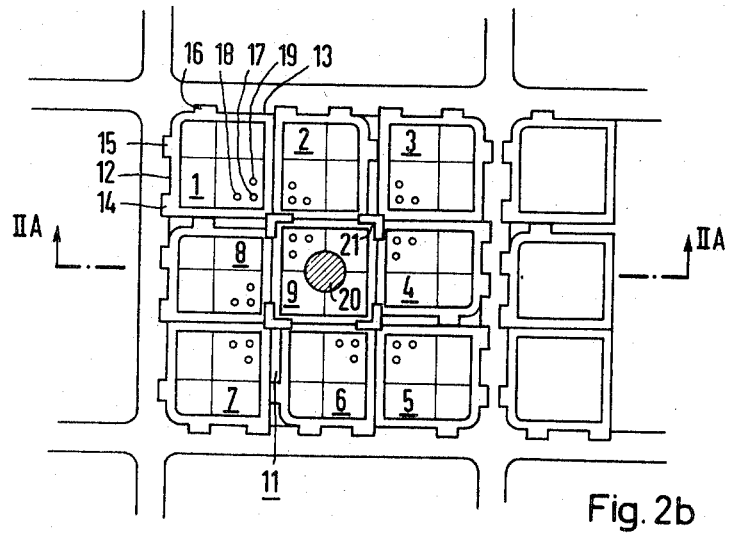
FIG. 2b is a top plan view of a fragment of the core support plate of our invention showing the cell structure thereof and the fuel elements inserted therein.

The fuel elements withdrawn from the reactor core 105 by the loading machine 115 can be lowered by means of an elevator shaft 120 into water-filled tanks that are located in a waterfilled fuel element basin 121. As shown in FIGS. 2a and 2b, nine regular fuel elements or breeder elements having a substantially square cross section are combined into respective groups. The nine fuel elements of each group are suspended from above in and through a cell 11 of a core support plate 10 which has a grating or grid-like construction. The outer fuel elements 1 to 8 of each group have the same structure. The upper portions thereof corresponding to the level of the core support plate 10 are indented or reduced in cross section on respectively two adjoining sides 12 and 13 thereof a distance equal to substantially half the thickness of the crosspieces or struts of the support plate 10 which define the cells 11 formed therein. At the upper end of the sides 12 and 13 of the fuel elements, collar-like suspension hooks 14, 15 and 16 are provided for suspending the respective fuel elements in the core support plate 10. On the other hand, a ninth or middle fuel element 9 which is surrounded by the fuel elements 1 to 8 has a uniform square cross section over the entire length thereof. At the upper end of the middle fuel element 9, laterally projecting mounting strips 21 are provided which are supported on chamfers or facets formed at the top of the outer fuel elements 1 to 8 so that the middle fuel element 9 is supported on the outer fuel elements 1 to 8. The middle fuel element 9 can also simultaneously contain a control rod 20 of conventional construction. To prevent undue stressing of the fuel rod can or jacket tubes it has been found to be advantageous to produce pressure equalization in the fuel rods with respect to the external main coolant. Accordingly, pressure, which is respectively below that of the external coolant pressure, is produced in the individual fuel bodies by additional gas. Connecting lines 17 are provided in the top or head of the individual fuel elements for supplying the pressure equalizing medium thereto. These connecting lines 17 are located in the corners of the outer surrounding fuel elements 1 to 8 which are adjacent to the middle fuel element 9.

Furthermore, orifices 22 for controlling the coolant flowthrough rate through the fuel elements are inserted in the upper portion of the fuel elements. These orifices 22 are adjustable in position by connecting members 18 in the tops or heads of the fuel elements. Moreover, thermocouple elements can be additionally provided in the fuel elements, the connections 19 thereto terminating in the tops or heads of the fuel elements.

Figure 3:
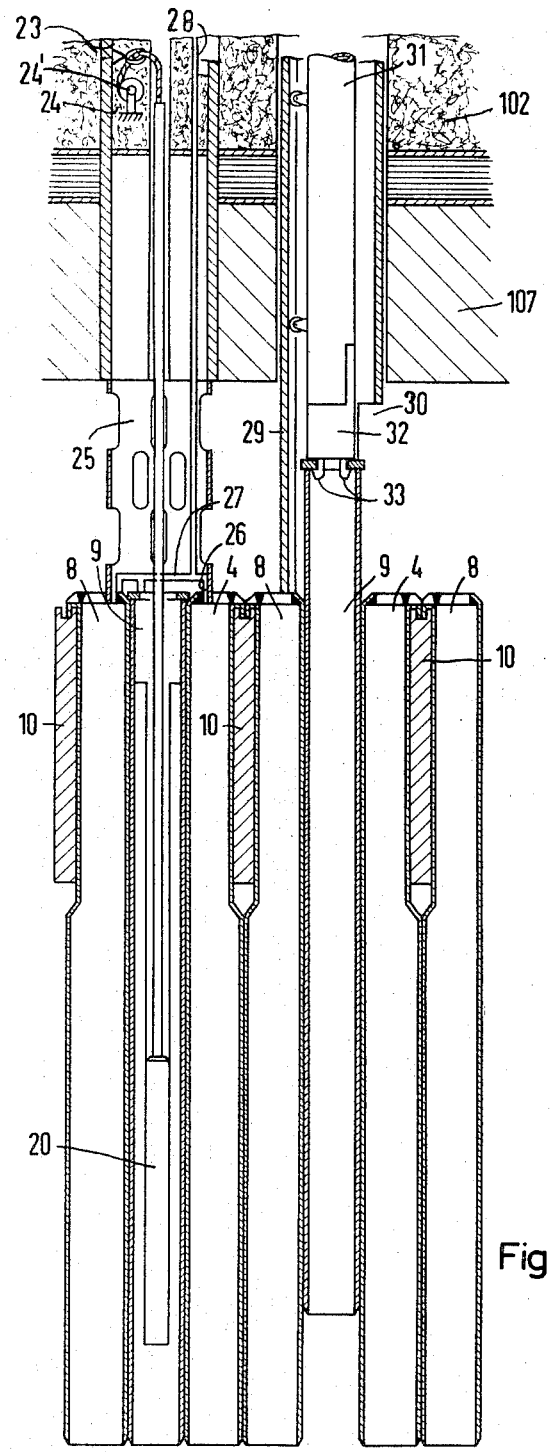
FIG. 3 is an enlarged fragmentary view of FIG. 1 showing in section part of the pressure vessel cover plate closed with a stopper, and several held-down fuel elements as well as a manipulator device holding a partially withdrawn fuel element.

In FIG. 3 there are shown two adjacent groups of fuel elements, the group shown at the left-hand side of the figure being in operationally ready condition and the group shown at the right-hand side of the figure being at a stage wherein the middle fuel element 9 is being withdrawn from the reactor core. The cover plate 102 of the reactor vessel and the thermal shield 107 located closely beneath the same are formed respectively with a bore 23 located above the middle fuel element 9 which, in the case of the group of fuel elements located at the left-hand side of FIG. 3 is closed with a stopper 24. A hollow cylindrical extension 25 provided with lateral openings is located below the stopper 24 and thereby holds down the middle fuel element 9 and also the outer surrounding fuel elements 1 to 8. A control rod drive 24' shown diagrammatically in FIG. 3 can be provided within the stopper 24 so that no portion of the drive mechanism need extend upwardly out of the cover plate 102. The control rod 20 is located substantially in the vicinity of the fission zone of the fuel element whereas the corresponding breeder zones are located respectively above and below the fission zone.

At the lower end of the extension 25 of the stopper 24, couplable connectors 26 for the pressure equalizing lines 17 and the thermocouple elements 19 are provided in the tops or heads of the fuel elements. The connectors 26 for the pressure equalizing lines 17 thus terminate in a common annular line or duct 27 from which the gas supply is centrally controlled through the line 28. An additional helium blocking gas duct can be desirable when $CO_2$ is employed as primary coolant and the introduction thereof into the fuel rods is to be avoided notwithstanding small leaks in the connectors.

On the right-hand side of FIG. 3, the exchange operation for the middle fuel element 9 is illustrated. The loading machine which is not shown in FIG. 3 travels above the cover plate 102 on a coordinate chassis or undercarriage so that it can travel over every point on the surface thereof. After the loading machine has been closely mounted on the concrete pressure vessel and after pressure equalization has been effected, the stopper 24 is loosened and is drawn into the loading machine. A hold-down tube 29 is then inserted into the thus freed opening 23. The hold-down tube 29 is formed at the lower end thereof with a lateral opening 30 which extends over an angle of about 90° of the cross section of the tube 29 shown more clearly in FIG. 4b. The hold-down tube 29 is coaxially rotatable in steps of 45° together with the manipulator linkage 31 of the manipulator device by a drive mechanism so that the manipulator tool or clamping tool 32 which is capable of travelling out of the lateral opening 30 can reach all of the fuel elements of each group which are mounted around the respective middle fuel element 9 thereof. By means of the hold-down tube 29, the fuel elements 1 to 8 are kept suspended in the support plate 10. Otherwise, when the middle fuel element 9 is withdrawn from the reactor core, due to frictional forces which might form between the fuel element columns that are surrounded with a sheet metal housing, the outer fuel elements 1 to 8 might slip out of their suspension holders at the core support plate 10 in the absence of the hold-down tube 29 and might drop downwardly. The middle fuel element 9 is then seized by the detents or catches 33 of the manipulating or clamping head 32 and is drawn upwardly into the loading machine with the aid of the manipulating linkage 31.

The loading machine 115 has a cooling system proper for cooling the consumed fuel elements that are received in the drum. The manipulating linkage which is in the form of a tube is also traversed by the cooling gas so that during the operation of withdrawing the fuel elements, the post-disintegration heat is adequately removed.

Figures 4A, 4B:
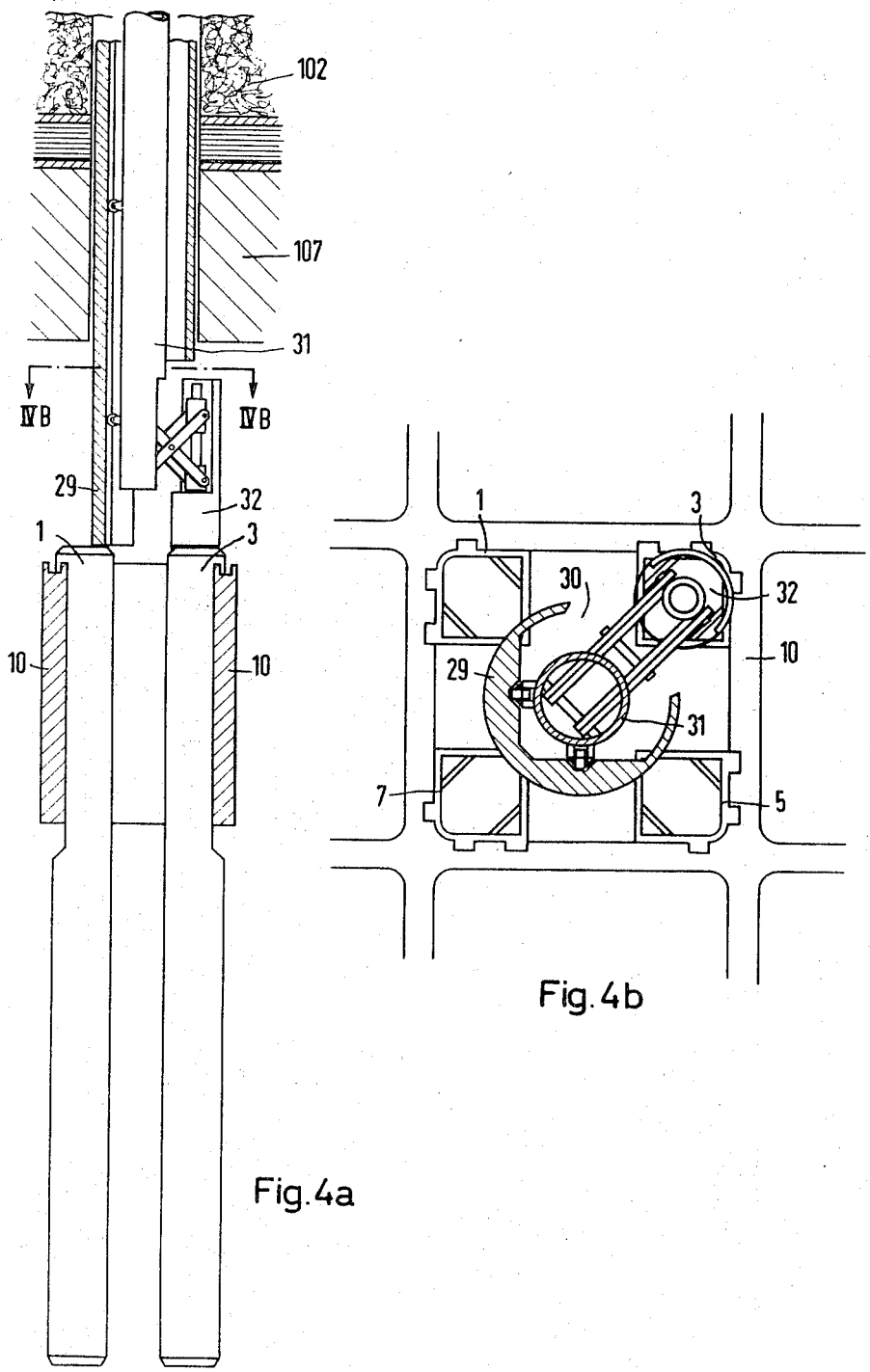
FIG. 4a is a longitudinal sectional view corresponding to the view at the right-hand side of FIG. 3 and showing the manipulator device withdrawing one of the outer eight fuel elements.
FIG. 4b is a cross-sectional view of FIG. 4a taken along the line IVB—IVB in the direction of the arrows.

In FIGS. 4a and 4b wherein the pulling or withdrawal of the fuel elements 1 to 8 that surround the middle fuel element 9 is illustrated, the manipulator or clamping head 32 of the manipulating device is caused to travel laterally through the aforedescribed opening 30 so that it can also reliably reach the fuel elements 1, 3, 5 and 7 located in the corners of the cell. According to the embodiment illustrated in FIGS. 4a and 4b, the outer fuel elements 1 to 8 are first gripped by the manipulator head 32, slightly raised so that they slip out of the holder of the core support plate 10, and are then drawn inwardly below the bore 23 formed in the cover plate 102 so that they can be reliably withdrawn through the bore 23 into the loading machine.

The operation for inserting or replacing the fuel elements occurs in a similar manner, but in reverse sequence. Thus, the fuel elements 1, 3, 5 and 7 are initially placed in the corners of the respective cells, and thereafter the fuel elements 2, 4, 6 and 8 are inserted between the fuel elements located in the corners of the cells.

Figure 5:
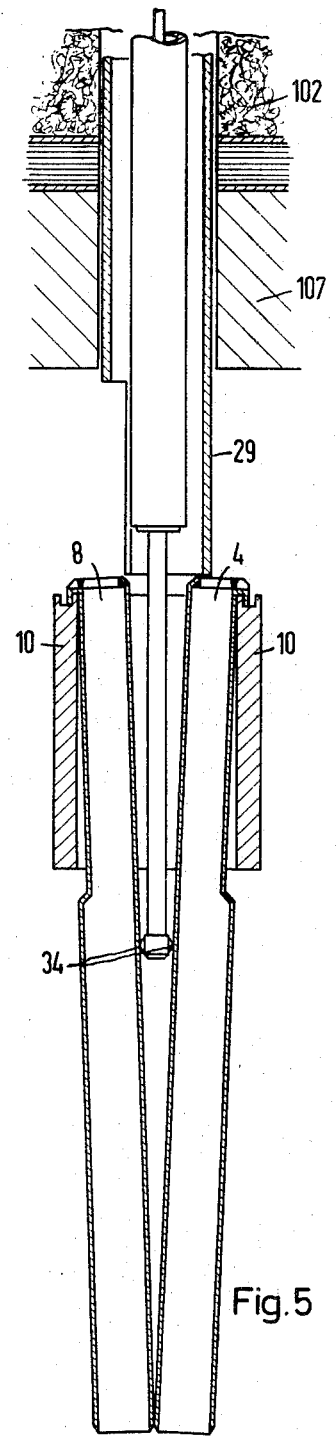
FIG. 5 is a longitudinal view similar to that of FIG. 4a showing the insertion of a spreading tool between partially inserted fuel elements.

FIG. 5 shows a cell with fuel elements partially inserted therein. When the corner fuel elements 1, 3, 5 and 7 are suspended, it is possible that due to the frictional forces which are formed, the fuel elements 4 and 8, on the one hand, and 2 and 6, on the other hand, which are located between the corner fuel elements, after being suspended in the core support plate 10 will not immediately hang vertically but will rather tend to be inclined at their lower ends toward the vertical axis of the cell. In order to place these fuel elements in their aforedescribed original position, a spreading tool 34 is forced downwardly, after the manipulating linkage has previously been raised into the loading machine, so as to displace the side fuel elements 4 and 8 back into their original position by means of the rollers mounted on the spreading tool 34. The same operation is carried out for restoring the two other lateral fuel elements 2 and 6 to their appropriate vertical positions. Finally, the central fuel element 9 can be inserted in the middle of the outer fuel elements 1 to 8. After withdrawing the hold-down tube 29 and inserting the stopper 24 with the extension member 25, the middle fuel element 9 and therewith also the surrounding fuel elements 1 to 8 are held down so that the reactor is again in readiness for operation.

To adjust the orifice rings 22 in the fuel elements, a tool can be lowered from the loading machine for actuating the connectors 18.

As aforementioned, the invention of our application is obviously not limited to the described embodiments. Instead of loading the reactor core through bores that are closed by individual stoppers, it can also be loaded by one or more manipulators which can be made to travel through openings from above into the space between the core and the cover of the pressure vessel when the reactor is inoperative. This space must above all have a relatively great height. Furthermore, the number of fuel elements per loading cell can be increased above nine. It is also conceivable to employ fuel elements with hexagonal cross section instead of square cross section, but in such a case more than one middle element must be present in and must be unloaded from each cell before the remaining fuel elements can be unloaded.

There can furthermore be located below the reactor core a mesh-like steel structure which, in the event of an inadvertently faulty loading, prevents the dropping of individual fuel elements on the distributor or separator cone. On the other hand, the mesh-like steel structure must be of such light construction that it will yield or break upon partial or total melting of the core.

We claim:

1. In a gas-cooled nuclear reactor, a pressure vessel, a grid-like core support plate with crosspieces defining a plurality of cells having a square cross section, each cell having suspended therein nine fuel elements, each fuel element having a square cross section, eight of said nine fuel elements being vertically disposed about a centrally located ninth fuel element to form a square, each of said eight fuel elements having two adjoining sides formed with an indentation located at the level of said core support plate, said indentations being equal to substantially half the thickness of the crosspieces of the core support plate defining the cells thereof, said indentations being provided with suspension hooks for engagement with the crosspieces of the core support for suspending each of said eight fuel elements in the core support plate, said centrally located ninth fuel element having a uniform square cross section over the entire length thereof and provided with laterally projecting mounting strips at its upper end with the strips supporting the ninth fuel element by resting on the top surfaces of the surrounding eight fuel elements.

2. Nuclear reactor according to claim 1, wherein said pressure vessel has an opening at the top thereof, a cover plate closing said opening, and an access bore for each of said unitary fuel element bundles being formed in said cover plate.

3. Nuclear reactor according to claim 1, wherein said core support plate is fastened to said cover plate by tie rods.

4. Nuclear reactor according to claim 1, wherein said ninth fuel element is in the middle of said group of fuel elements and has a uniform square cross section over the entire length thereof.

5. Nuclear reactor according to claim 1, wherein said centrally located fuel elements are each provided with a control rod disposed therein.

6. Nuclear reactor according to claim 1, wherein said core support plate and said fuel elements are mounted in a cylindrical pressure vessel directly beneath a cover plate for the pressure vessel and a thermal shield superimposed thereon, both said cover plate and said thermal shield being formed with a bore located above said centrally located fuel element, a stopper means adapted to close said bore and being provided with a laterally perforated hollow cylindrical extension for holding down said centrally located fuel element and, in turn, said eight fuel elements surrounding said centrally located fuel element of each cell, and a loading machine having a fuel element drum magazine and capable of travelling on the upper side of said cover plate, winch means and manipulator means carried by said loading machine, and a tubular hold-down member for said surrounding eight fuel elements insertable through said bore in said cover plate, upon removal of said stopper means therefrom by said loading machine.

7. Nuclear reactor according to claim 6, wherein said tubular hold-down member is formed at the lower end thereof with a lateral opening extending over an angle of substantially 90° of the cross section of said tubular hold-down member, said manipulator means being movable along said tubular hold-down member and through said lateral opening thereof for seizing and withdrawing said outer eight fuel elements from said cell of said core support plate.

8. Nuclear reactor according to claim 6, wherein said manipulator means and said tubular hold-down member are coaxially rotatable in steps of 45°.

9. Nuclear reactor according to claim 7, wherein said manipulator means is movable along said tubular hold-down member and through said lateral opening thereof for inserting the outer fuel elements in said cell initially at the four corners thereof.

* * * * *

UNITED STATES PATENT OFFICE
CERTIFICATE OF CORRECTION

Patent No. 3,350,794　　　　　　　　　Dated November 26, 1974

Inventor(s) Erwin Laurer and Hans-Peter Schabert

It is certified that error appears in the above-identified patent and that said Letters Patent are hereby corrected as shown below:

In the heading to the printed specification, after line 10, insert -- Foreign Application Priority Data May 3, 1968　　Germany.......P 17 64 258.9--

Signed and sealed this 11th day of February 1975.

(SEAL)
Attest:

RUTH C. MASON
Attesting Officer

C. MARSHALL DANN
Commissioner of Patents
and Trademarks